Figure 1:
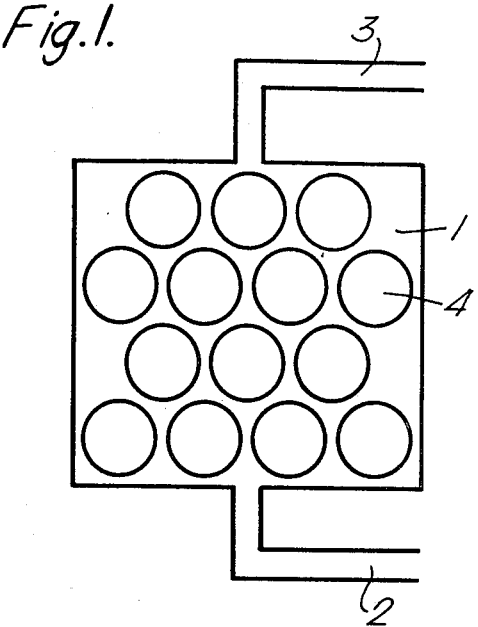

United States Patent [19]

Ehlers et al.

[11] 4,372,866

[45] Feb. 8, 1983

[54] HEAT STORAGE MEDIUM OF NAOH-H₂O-TEO₂

[75] Inventors: Joern Ehlers, Uetersen; Helmut Haukelt, Hamburg, both of Fed. Rep. of Germany

[73] Assignee: The British Petroleum Company Limited, London, England

[21] Appl. No.: 269,812

[22] Filed: Jun. 3, 1981

[30] Foreign Application Priority Data

Jun. 3, 1980 [DE] Fed. Rep. of Germany ....... 3020983
Jun. 3, 1980 [JP] Japan ................................... 3020984

[51] Int. Cl.³ .............................................. C09K 3/18
[52] U.S. Cl. ................................. 252/70; 165/104.17; 252/71
[58] Field of Search ............... 252/70, 71; 165/104.17; 126/400

[56] References Cited

PUBLICATIONS

Energy Research, vol. 1, pp. 351–363, (1977).
Heating, Piping and Air Conditioning, pp. 147–151, Dec. 1957.
Ashrae Journal, pp. 38–44, Sep. 1974.

Primary Examiner—Thurman K. Page
Attorney, Agent, or Firm—Morgan, Finnegan, Pine, Foley & Lee

[57] ABSTRACT

A heat storage medium consists of sodium hydroxide and water, the sodium hydroxide concentration being in the range greater than the stoichiometric concentration in sodium hydroxide monohydrate up to and including 80% by weight, the water concentration being in the range less than the said stoichiometric concentration down to and including 20% by weight. Within this particular concentration range the tendency of the sodium hydroxide water system to supercool diminishes after a few cycles. The initial supercooling may be reduced by the addition of tellurium dioxide in amount 0.1 to 2.0% by weight of the combined weight of sodium hydroxide and water.

4 Claims, 2 Drawing Figures

HEAT STORAGE MEDIUM OF NAOH-H$_2$O-TEO$_2$

This invention relates to a heat storage medium containing sodium hydroxide and water and, optionally, tellurium dioxide.

Heat storage systems in which the latent heat of fusion of a substance is utilised are known, for example, from Energy Research, Vol. 1, pages 351-363 (1977), and also from Ashrae Journal, September 1974, pages 38-44. The use of sodium hydroxide monohydrate as a heat storage medium is disclosed in CH-PS 363130 and the use of sodium hydroxide water compositions containing 64 to 74% by weight sodium hydroxide, together with a corrosion inhibitor, in DE-OS No. 2845865.

Heat storage media of the above mentioned type should comply with the following requirements:
1. The latent heat of fusion should be considerably greater than that of water.
2. The phase-change temperature should be substantially constant, i.e. the temperature difference between the charging (liquefying) and the discharging (solidifying) stage should be small.
3. The physical properties of the storage medium should not impose any special demands on the design of storage tanks.
4. The charging and discharging stages should be capable of being repeated as often as desired.

Attempting to select suitable heat storage media from thermodynamic data alone does not necessarily lead to success because supercooling of the melt frequently occurs before crystallisation takes place. Supercooling is undesirable in this context because it reduces the efficiency of the energy storage.

Means for reducing supercooling are known. The most effective is the addition of a substance which possesses a similar crystalline structure to the heat storage medium but is insoluble in it and has a higher melting point. This acts as a nucleating agent by providing nuclei to initiate crystallisation of the storage medium. However, not every substance which satisfies these requirements in respect of a particular storage medium is capable of preventing supercooling of the medium. Therefore it is not possible to choose suitable combinations of heat storage medium and nucleating agent by theoretical considerations from thermodynamic and crystallographic data.

It is an object of the present invention to provide a heat storage medium in which supercooling of the melt is reduced.

We have discovered that this object can be achieved by the use of a composition of specified concentration limits.

Thus according to the present inventiion there is provided a heat storage medium consisting of sodium hydroxide and water, the sodium hydroxide concentration being in the range greater than the stoichiometric concentration in sodium hydroxide monohydrate up to and including 80% by weight, the water concentration being in the range less than said stoichiometric concentration down to and including 20% by weight, the percentages being expressed as percentages by weight of the combined weight of sodium hydroxide and water.

Surprisingly, it has been found that although this medium does supercool to a considerable extent during the first few cycles, this soon reduces to a maximum of about 3 Centigrade degrees.

Preferably the heat storage medium contains 70 to 74% by weight of sodium hydroxide.

The preferred lower limit of 70% by weight sodium hydroxide is based on the fact that the reduction of the supercooling effect during the first cycles is most noticeable with sodium hydroxide contents of 70% by weight and over.

At concentrations above 74% by weight, the solid phase may not liquefy completely on fusion and this problem becomes intensified at concentrations above 80% by weight. Furthermore, economic considerations render higher sodium hydroxide contents undesirable.

The initial supercooling can be reduced by the presence of tellurium dioxide initially present in the solid form.

Thus the heat storage medium may additionally contain 0.1 to 2.0%, preferably 0.1 to 0.5%, of tellurium dioxide, expressed as a percentage by weight of the total weight of sodium hydroxide and water.

If the tellurium dioxide is initially present in the undissolved form, then the intial supercooling is virtually eliminated. As it dissolves, its effect diminishes, but by this time the ageing of the medium takes effect so that the supercooling is eventually limited to 3 Centigrade degrees as before.

A heat storage medium according to the present invention is suitable for use in the temperature range in which central heating units customarily operate (about 60°-70° C.). It has the relatively high phase conversion enthalpy of about 480 kJ/liter. A further advantage of this system is that during phase transition only slight alteration in density occurs so that storage tanks are not likely to be damaged because of an increase in volume of the contents.

Heat storage media according to the present invention consisting of sodium hydroxide and water are particularly suitable for use in heat storage systems which operate with intermediate heat transfer media. Usually in such systems a liquid which is insoluble in, inert to and less dense than the storage medium is used as the transfer medium. Liquid hydrocarbons are particularly prefered as transfer media, e.g. white oils and light lubricating oils such as spindle oil.

It has been found that the supercooling of a heat storage medium according to the present invention can be virtually eliminated if the inert transfer medium, e.g. a liquid hydrocarbon, is allowed to bubble through the melt in the form of small droplets. The bubbling through of hydrocarbons as intermediate heat-carriers is known as such from Heating, Piping and Air Conditioning, December 1957, pages 147-151. However, it has now been found that in heat storage media of the present invention, crystals accumulate preferentially at the transfer medium/melt phase boundary. These are continually conveyed upwards with the rising transfer medium and thus act as crystallisation nuclei which do not settle on the bottom of a storage tank as in other systems, e.g. systems using Glauber's salts.

Figure 2:
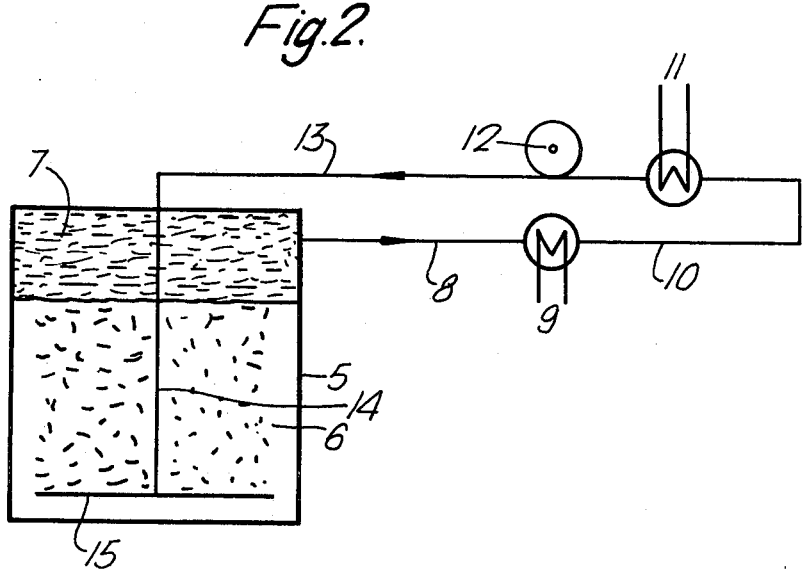

The invention is illustrated with reference to FIGS. 1 and 2 of the accompanying drawings wherein FIG. 1 is a diagrammatic representation of one type of heat storage unit and FIG. 2 is a diagrammatic representation of a second type of heat storage unit linked to a heating system.

The heat storage unit of FIG. 1 comprises a heat exchanger 1 connected at its lower end by a line 2 to a source of heat or the return from a central heating system and at its upper end by a line 3 to the feed to the central heating system.

The heat exchanger 1 contains a number of spherical tanks 4 which contain the heat storage medium of the invention.

A heat transfer liquid is pumped through the heat exchanger.

Materials which are impermeable to the heat transfer liquid e.g. metal, are normally used in the construction of the tanks 4. Putting the heat storage medium into such tanks provides the advantage that the heat exchange surface can be determined by the shape of the tanks.

Water can be used as the heat transfer liquid in the heat exchanger as a result of which direct connection to a central heating system is possible.

Alternatively, the tanks 4 can be made from a material which is permeable to the transfer liquid, e.g. polyethylene or polypropylene. In such cases, liquids which are immiscible with the sodium hydroxide-water system must be used, e.g. the liquid hydrocarbons previously mentioned.

FIG. 2 illustrates a dynamic heat storage system. It comprises a heat exchanger 5 which is filled with the heat storage medium 6 of the inventon and a heat transfer liquid 7 which is a hydrocarbon.

The hydrocarbon 7 is passed through line 8 to a central heating system 9 where it gives up part of its heat energy content. The hydrocarbon is then passed through a line 10 to a source of heat 11 where heat is supplied to it as required. At this point a heat pump, for example, may be installed. The hydrocarbon is then returned by a pump 12, a line 13 and a line 14. The latter projects almost to the bottom of the tank 5 and terminates in a sparger outlet 15 from which the hydrocarbon emerges in fine droplets which rise upwards through the heat storage medium and are thus heated or give off heat.

A more detailed description of a dynamic heat storage system of the type hereinbefore described is to be found in the reference previously cited, Heating, Piping and Air Conditioning, December 1957, pages 147–151.

Virtually no supercooling occurs in a heat storage medium according to the present invention when used in the system described in FIG. 2.

We claim:

1. A heat storage medium consisting of 70 to 74% by weight of sodium hydroxide, 30 to 26% by weight of water and 0.1 to 2.0% by weight of tellurium dioxide, expressed as a percentage by weight of the combined weight of sodium hydroxide and water.

2. A heat storage medium according to claim 1 wherein the tellurium dioxide concentration is in the range 0.1 to 0.5% by weight.

3. A heat storage system comprising a heat storage medium according to claim 1 and a liquid heat transfer medium which is insoluble in, inert to and less dense than the heat storage medium wherein the heat storage medium is a heat storage medium according to claim 1.

4. A heat storage system according to claim 3 wherein the liquid heat transfer medium is a liquid hydrocarbon fraction.

* * * * *